(12) United States Patent
Kadam et al.

(10) Patent No.: US 11,513,496 B2
(45) Date of Patent: Nov. 29, 2022

(54) SYSTEMS AND METHODS OF MONITORING AND CONTROLLING AN INDUSTRIAL PROCESS

(71) Applicant: ExxonMobil Technology and Engineering Company, Annandale, NJ (US)

(72) Inventors: Jitendra V. Kadam, Kingwood, TX (US); Apostolos T. Georgiou, Spring, TX (US); Kiran R. Sheth, Sugar Land, TX (US); Weimen Li, The Woodlands, TX (US); Onur Onel, Houston, TX (US); Joshua L. Pulsipher, Madison, WI (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 172 days.

(21) Appl. No.: 17/126,151

(22) Filed: Dec. 18, 2020

(65) Prior Publication Data
US 2021/0191365 A1    Jun. 24, 2021

Related U.S. Application Data

(60) Provisional application No. 62/950,616, filed on Dec. 19, 2019.

(51) Int. Cl.
| | |
|---|---|
| *G05B 19/414* | (2006.01) |
| *G06N 20/00* | (2019.01) |
| *G05B 13/02* | (2006.01) |
| *G06K 9/62* | (2022.01) |
| *G05B 19/042* | (2006.01) |
| *G05B 13/04* | (2006.01) |
| *G06V 20/40* | (2022.01) |

(52) U.S. Cl.
CPC ....... *G05B 19/414* (2013.01); *G05B 13/0265* (2013.01); *G05B 13/042* (2013.01); *G05B 19/0423* (2013.01); *G06K 9/6259* (2013.01); *G06N 20/00* (2019.01); *G06V 20/46* (2022.01)

(58) Field of Classification Search
None
See application file for complete search history.

(56) References Cited

U.S. PATENT DOCUMENTS

2012/0262583 A1* 10/2012 Bernal ............... H04N 5/33
348/E5.09

\* cited by examiner

*Primary Examiner* — Carlos R Ortiz Rodriguez
(74) *Attorney, Agent, or Firm* — Vorys, Sater, Seymour and Pease LLP (57) ABSTRACT

A method of monitoring and controlling an industrial process includes capturing images of a non-sensible process condition of the industrial process with an image capture device, receiving the images of the non-sensible process condition with a computer system, and converting each image into a corresponding numeric value with a machine learning model stored in and operable by the computer system. The corresponding numeric value is then received and compared to a predetermined numeric value for the non-sensible process condition with a closed-loop controller, and an actuator operates with the closed-loop controller to adjust operation of the industrial process when the corresponding numeric value fails to match the predetermined numeric value or is outside of a defined threshold near the predetermined numeric value.

23 Claims, 5 Drawing Sheets

SYSTEMS AND METHODS OF MONITORING AND CONTROLLING AN INDUSTRIAL PROCESS

CROSS REFERENCE TO RELATED APPLICATION

This application relates and claims priority to U.S. Provisional Patent Application No. 62/950,616, filed on Dec. 19, 2019, the disclosure of which is incorporated in its entirety specifically by reference herein.

FIELD

The present disclosure is related to maintaining operation of complex industrial processes and, more particularly, to autonomous control and optimization of non-sensible process conditions for complex industrial processes.

BACKGROUND

Developing complex industrial processes requires massive capital expenditures, and efficiently maintaining and operating the industrial process is an important part of business profitability. To avoid lost revenue and mitigate catastrophic failures, numerous sensors, gauges, and large engineering teams are often employed to monitor and maintain the equipment and operation of an industrial processes. Traditional thermodynamic process sensors, however, often cannot accurately represent certain characteristics or properties of some industrial processes or are otherwise unreliable in certain applications.

A polymer extruder is one example of an industrial process and can employ one or more sensors (e.g., differential pressure, nuclear, steam pressure, etc.) that continuously measure and report the material level (height) within the extruder vessel during operation. To avoid process equipment trips, the molten polymer within the extruder must be constantly regulated to a predetermined (proper) operating level. Existing conventional and inferential sensor measurements, however, are too unreliable for automatic level control in all extruder operating conditions. Consequently, real-time video feed of extruder internal conditions is sometimes also required, and a trained operator or personnel monitors the video feed during transient operation conditions such as start-ups or shut-downs. When these transient conditions are occurring, the extruder operator will disable automatic control and commence manual control of the extruder (e.g., flow into the vessel) based on the real-time images obtained in the video feed and until proper operating conditions are again attained. Training and experience allows the operator to make heuristic (subjective) measurement judgments of the industrial process depicted in the video feed and alter operating parameters until the proper operating conditions are achieved.

Since many operational changes undertaken by an operator of industrial processes are routine, what is desired is a system and method of replicating or replacing heuristic measurement judgments made by trained operators. This may be advantageous and useful in monitoring and controlling non-sensible process conditions, especially where no accepted standard of measure exists for visual-driven operational monitoring, control, and safety that is consistent and effective.

SUMMARY

In one or more aspects of the disclosure, a method of monitoring and controlling an industrial process is disclosed and includes capturing images of a non-sensible process condition of the industrial process with an image capture device, receiving the images of the non-sensible process condition with a computer system, converting each image into a corresponding numeric value with a machine learning model stored in and operable by the computer system, receiving and comparing the corresponding numeric value to a predetermined numeric value for the non-sensible process condition with a closed-loop controller, and causing an actuator to operate with the closed-loop controller and thereby adjusting operation of the industrial process when the corresponding numeric value fails to match the predetermined numeric value or is outside of a defined threshold near the predetermined numeric value. In some aspects, the method may further include training the machine learning model by collecting video data of the non-sensible process, manually labelling each image of the video data with a human-supplied numeric value, inputting the video data and the human-supplied numeric value into the machine learning model, calculating a predicted numeric value with the machine learning model based on the video data, comparing the predicted numeric value with the human-supplied numeric value, and optimizing the predicted numeric value in view of the human-supplied numeric value until error between the predicted numeric value and the human-supplied numeric value is minimized. In some aspects, manually labelling each image of the video data comprises labelling each image with a trained operator based on the operator experience with the nonsensible process condition. In some aspects, manually labelling each image of the video data further comprises associating the human-supplied numeric value with a time and a frame of the video data. In some aspects, optimizing the predicted numeric value includes incrementally adjusting one or more numerical weights within the machine learning model, outputting a new predicted numeric value based off a new model utilizing the one or more numerical weights, and repeating steps a) and b) until the one or more numerical weights are such that the error in the predicted numerical value is minimized. In some aspects, the method may further include training the machine learning model by collecting video data of the non-sensible process, collecting laboratory measurements of the non-sensible process, inputting the video data and the laboratory measurements into the machine learning model, calculating a predicted numeric value with the machine learning model based on the video data, comparing the predicted numeric value with the laboratory measurements, and optimizing the predicted numeric value in view of the laboratory measurements until error between the predicted numeric value and the laboratory measurements is minimized. In some aspects, the corresponding numeric value comprises a numeric form recognizable by the closed-loop controller and selected from the group consisting of a percentage, a real number, a scaled number, a classifier, a class, and any combination thereof. In some aspects, converting each image into the corresponding numeric value with the machine learning model is preceded by receiving each image with an auto-encoder module, removing outlier data from each image with the auto-encoder module, generating a reproduced image without the outlier data for each image, and providing the reproduced image to the machine learning model for calculating the numeric value. In some aspects, the method may further include calculating an error between the reproduced image and an original image for each image, and generating a confidence metric based on the error. In some aspects, the method may further include disregarding the corresponding numeric value when the confidence metric falls below a predetermined confidence threshold.

In one or more additional aspects of the disclosure, a process control system is disclosed and includes an image capture device positionable to capture images of a non-sensible process condition of an industrial process, a computer system that receives the images of the non-sensible process condition, a machine learning model stored in and operable by the computer system to convert each image into a corresponding numeric value, a closed-loop controller that receives and compares the corresponding numeric value to a predetermined numeric value for the non-sensible process condition, and an actuator operable to regulate operation of the industrial process, wherein, when the corresponding numeric value fails to match the predetermined numeric value or is outside of a defined threshold near the predetermined numeric value, the closed-loop controller causes the actuator to operate and adjust operation of the industrial process. In some aspects, the image capture device is selected from the group consisting of a two-dimensional camera, a three-dimensional camera, a high-definition camera, an infrared camera, a laser scanner, a line scan camera, a thermal camera, and any combination thereof. In some aspects, the machine learning model is trained by collecting video data of the non-sensible process, manually labelling each image of the video data with a human-supplied numeric value, inputting the video data and the human-supplied numeric value into the machine learning model, calculating a predicted numeric value with the machine learning model based on the video data, comparing the predicted numeric value with the human-supplied numeric value, and optimizing the predicted numeric value in view of the human-supplied numeric value until error between the predicted numeric value and the human-supplied numeric value is minimized. In some aspects, each image of the video data is manually labelled by a trained operator based on the operator experience with the nonsensible process condition. In some aspects, each image of the video data is labelled with a time and a frame of the video data. In some aspects, the corresponding numeric value comprises a numeric form recognizable by the closed-loop controller and selected from the group consisting of a percentage, a real number, a scaled number, a classifier, a class, and any combination thereof. In some aspects, the process control system may further include an auto-encoder operable to receive each image and remove outlier data from each image to provide a reproduced image without the outlier data to the machine learning model for calculating the numeric value. In some aspects, the auto-encoder is further operable to calculate an error between the reproduced image and an original image for each image, and generate a confidence metric based on the error. In some aspects, the industrial process comprises a polymer extruder having an extruder vessel, and the non-sensible process condition is a level of molten polymer within the extruder vessel. In some aspects, the industrial process comprises a flare stack that emits a flare, and the non-sensible process condition is selected from the group consisting of a quantity of smoke in the flare, a color of the smoke, an opacity of the smoke, a color of the flare, a size of the flare, a time interval between smoking and flaring, a fuel-air combustion ratio, and any combination thereof. In some aspects, the industrial process comprises a flare stack or a furnace that emits a flame, and the non-sensible process condition is selected from the group consisting of flame stability, shape of the flame, size of the flame, frequency of flicker of the flame, a fuel-air combustion ratio and any combination thereof.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Embodiments of the present disclosure describe systems and methods of autonomously controlling and optimizing non-sensible process conditions for complex industrial processes, and doing so in real-time. As used herein, the phrase "non-sensible" refers to something that cannot be measured or sensed using typical (common) thermodynamic sensors or gauges that output a measured numeric value; e.g., sensors for measuring pressure, temperature, density, flow rate, material level, radiance, etc. Accordingly, "non-sensible process conditions" are process states or characteristics present in an industrial process that are generally non-verifiable using common measurement techniques, or alternatively process states or characteristics where typical thermodynamic sensors are often inaccurate or unreliable and, therefore, inadequate to properly characterize the real-time condition (state) of the non-sensible process.

Example non-sensible process conditions include, but are certainly not limited to, the polymer level (height) in a polymer extruder, stability of flames emitted from a furnace burner or flare stack, smoke measurement (e.g., quantity or presence) in a flame emitted from a flare stack, and other process conditions that are generally non-readily or reliably detected. Traditional thermodynamic sensors are generally unable to accurately and reliably measure the foregoing process conditions (states), but instead require the aid of a trained personnel (e.g., a trained operator). More specifically, real-time images and/or video (referred to herein as "real-time video feed") are often obtained of the non-sensible process and displayed on a visual display, such as a television or computer monitor or screen. Trained personnel monitor the non-sensible process conditions as depicted in the real-time video feed and controls the non-sensible process based on the depicted images. In some cases, the trained personnel may operate an actuator to alter operating parameters of the industrial process until the process condition reaches a predetermined or "safe" operating level or state.

The real-time video feed pushed to the visual display constitutes non-thermodynamic and non-numeric sensor data derived from an image capture device (e.g., a camera or the like). Automated process systems are generally unable to interpret video signals for non-sensible processes, so the real-time video feed requires operator attention to ensure the process conditions are maintained properly.

According to embodiments of the present disclosure, non-thermodynamic, non-numeric sensor data derived from an image capture device may be used for closed-loop advanced control of non-sensible process conditions. More specifically, a video camera may capture the real-time visual state of a non-sensible process, and a computer system may be programmed and otherwise configured to receive and translate the visual state of the process condition into a numeric state (value) that is more suitable for computer application-based control and real-time process optimization. As described herein, a deep machine learning and artificial intelligence model run by the computer system is developed to translate the visual state of the process condition into the numeric state (value). Once the numeric state (value) of the non-sensible process condition is obtained, the computer system may be programmed to automate routine operator moves related to the non-sensible process based on the real-time video feed.

Accordingly, embodiments disclosed herein demonstrate how a combination of non-thermodynamic, non-numeric sensors (e.g., a camera) and machine learning algorithms can be used for proper representation (sensing) and control of non-sensible process conditions of an industrial process. The principles of the present disclosure can be especially advantageous where existing measurement technologies are insufficient or do not exist for specific non-sensible applications. The principles described herein may be used to replicate or replace heuristic (subjective) judgments of measurements made by trained personnel, and thereby automate processes that have historically required a human element.

It should be noted that while the bulk of the present disclosure is related to monitoring and managing specific complex industrial processes, including industrial processes associated with the oil and gas and chemical industries, it is contemplated herein that the disclosed systems and methods may be used in conjunction with any type of complex industrial process that may include or operate a non-sensible process. For example, the principles of the present disclosure may be equally applicable to other industries such as, but not limited to, food processing and production, paint processing and production, medicine processing and production, packaging extrusion and blowing industries, and others.

Figure 1:
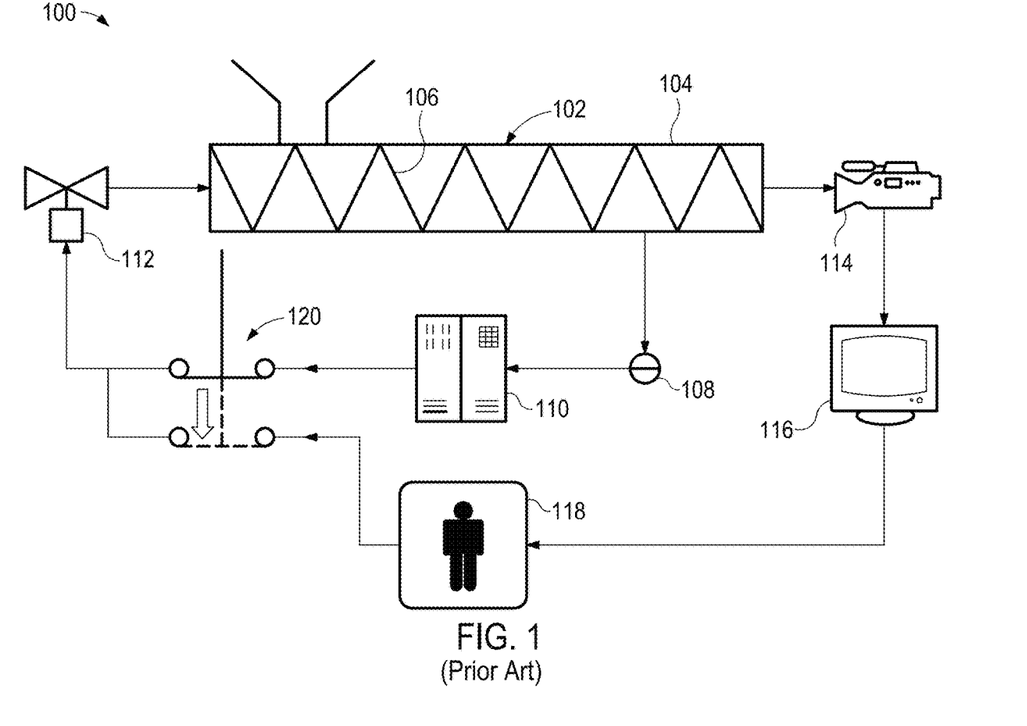
FIG. 1 is a schematic diagram of an example prior art human control loop for an example industrial process

FIG. 1 is a schematic diagram of an example prior art process control system 100 for an example industrial process 102. The industrial process 102 may be any process or system that includes or operates at least one non-sensible process, as defined herein, and the process control system 100 (alternately referred to as a process control "scheme") is designed to monitor and control a non-sensible process condition. In the illustrated example, the industrial process 102 is a polymer extruder that includes an extruder vessel 104 and a screw gear 106 rotatably mounted within the extruder vessel 104, and the non-sensible process condition of the industrial process 102 may be the level (height) of molten polymer within the extruder vessel 104 during operation. As mentioned above, however, the industrial process 102 may alternatively comprise a flare stack or a furnace, and the non-sensible process condition may be flame stability or smoke measurement (e.g., quantity), or industrial processes having process conditions that are generally non-readily or reliably detected.

To avoid process equipment trips, the molten polymer within the extruder vessel 104 must be constantly regulated to a predetermined (proper) operating level. To accomplish this, the process control system 100 may include one or more thermodynamic sensors 108 that continuously monitor the polymer level within the extruder vessel 104. Example thermodynamic sensors 108 that may be used to monitor polymer level include, but are not limited to, a differential pressure sensor, a nuclear sensor, a steam pressure sensor, or any combination thereof. The thermodynamic sensor(s) 108 may communicate with a closed-loop controller 110, which may be in communication with one or more actuators 112 designed to regulate flow into the extruder vessel 104. In some embodiments, the closed-loop controller 110 may comprise, for example, a proportional-integral-derivative (PID) controller, but could alternatively comprise any control loop mechanism employing feedback for continuous modulated control of the non-sensible process.

The closed-loop controller 110 may be configured and otherwise programmed to compare measurements obtained by the thermodynamic sensor(s) 108 with a predetermined or desired numeric value for the non-sensible process condition. If the incoming numeric value does not match the predetermined numeric value or is not within (falls outside of) a defined threshold (range) near the predetermined numeric value, the closed-loop controller 110 may be configured to automatically operate the actuator(s) 112 to regulate operation of the industrial process 102 until proper operating conditions for the non-sensible process condition are again attained.

Measurements obtained by the thermodynamic sensor(s) 108, however, are sometimes too unreliable for automatic level control of the molten polymer, especially during transient operating conditions occurring during startup and shutdown. To account for such transient operating conditions, the process control system 100 includes an image capture device 114 configured to obtain one or more real-time images (i.e., still images or video) of the non-sensible process condition and display the real-time image(s) as "real-time video feed" on a visual display 116. The image capture device 114 may comprise any device, system, or mechanism capable of capturing two-dimensional (2D) or three-dimensional (3D) images or video. Examples of the image capture device include, but are not limited to, a 2D camera, a 3D camera, a high-definition camera, an infrared camera, a line scan camera, a laser scanner, a light detection and ranging (LIDAR) device, a thermal camera, or any combination thereof. The visual display 116 may comprise, for example, a television or computer monitor or screen, but could alternatively comprise a handheld device or laptop computer.

An operator 118 (e.g., one or more trained personnel) monitors the real-time video feed shown on the visual display 116, and upon observing transient conditions, the operator 118 throws a manual override switch 120 to disable automatic control of the industrial process 102 and allows the operator 118 to manually control operation. In the present example, once the manual override switch 120 is tripped, the operator 118 may manually control operation of one or more actuators 112 designed to regulate flow into the extruder vessel 104. Training and experience allows the operator 118 to make heuristic (subjective) measurement judgments of how to appropriately control the actuator(s) 112 to properly regulate the non-sensible process until proper operating conditions are again attained.

Accordingly, in the prior art process control system 100 the operator 118 acts as the controller to ensure proper operating conditions are achieved. Because automated systems cannot generally interpret real-time image or video signals for non-sensible processes, the real-time video feed obtained by the image capture device 114 requires operator 118 attention and heuristic decision-making.

Figure 2:
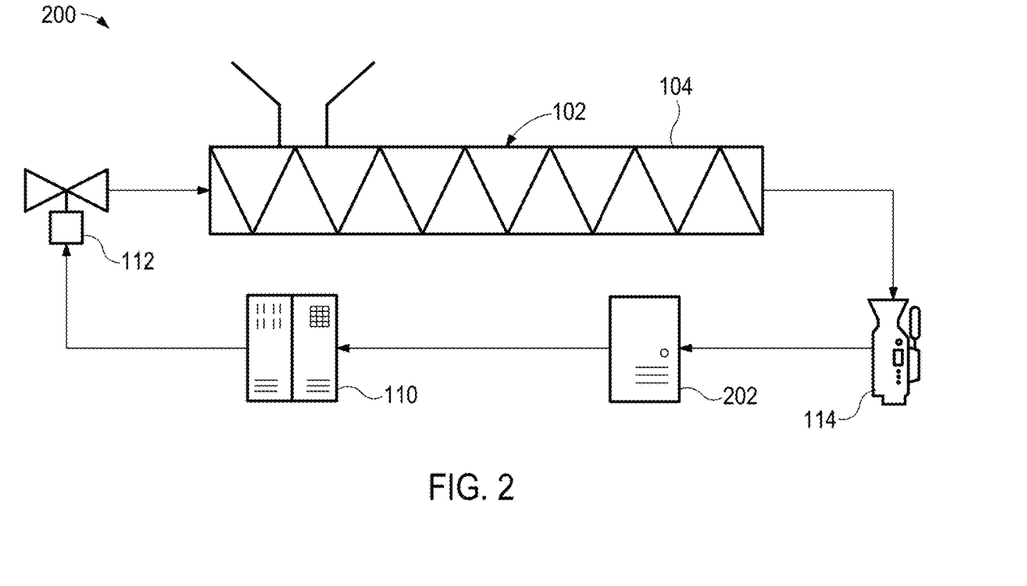
FIG. 2 is a schematic diagram of an example process control system in accordance with the principles of the present disclosure.

FIG. 2 is a schematic diagram of an example process control system 200 in accordance with the principles of the present disclosure. The process control system 200, alternately referred to as a "process control scheme," may be similar in some respects to the process control system 100 of FIG. 1, and therefore may be best understood with reference thereto, where like numerals will represent like components not described again in detail. Similar to the process control system 100, the process control system 200 is designed to monitor and control operation of the industrial process 102 and, more particularly, a non-sensible process condition of the industrial process 102. As indicated above, the non-sensible process condition may be the level (height) of molten polymer within the extruder vessel 104 during operation, but could alternatively comprise other non-sensible process conditions, without departing from the scope of the disclosure. Moreover, similar to the process control system 100, the process control system 200 includes the image capture device 114 configured to obtain one or more real-time images and/or video of the non-sensible process condition.

Unlike the process control system 100 of FIG. 1, however, the process control system 200 does not require the operator 118 (FIG. 1) to continuously monitor the real-time video feed on the visual display 116 (FIG. 1) and manually control operation of the non-sensible process to help maintain proper operating conditions. Instead, the process control system 200 includes a computer system 202 (alternately referred to as a "computer vision system") communicably coupled to the closed-loop controller 110. In some embodiments, the closed-loop controller 110 may form part of the computer system 202, but in other embodiments, as illustrated, the closed-loop controller 110 may comprise a separate component part of the process control system 200.

The computer system 202 has stored thereon a machine learning model trained to receive the real-time video feed obtained by the image capture device 114 and convert images of the non-sensible process condition into corresponding numeric values that can be interpreted by the closed-loop controller 110. As used herein, the term "machine learning" also includes what is known as "deep learning", and the two may be used interchangeably herein. The closed-loop controller 110 may be configured and otherwise programmed to compare the incoming (calculated) numeric values with a predetermined or desired numeric value for the non-sensible process condition. If the incoming numeric value does not match the predetermined numeric value or is not within (falls outside of) a defined threshold (range) near the predetermined numeric value, the closed-loop controller 110 may be configured to automatically operate the actuator(s) 112 to regulate operation of the industrial process 102 until proper operating conditions for the non-sensible process condition are again attained.

While not shown, in some embodiments, the thermodynamic sensor(s) 108 (FIG. 1) may also be included in the process control system 200 and in communication with the closed-loop controller 110, as generally described above. In such embodiments, the thermodynamic sensor(s) 108 and the computer system 202 may operate jointly to provide adequate measurement and control over all operating states of the industrial process 102. In some applications, for instance, the computer system 202 may be used to control operation of the industrial process 102 when traditional sensing using the thermodynamic sensor(s) 108 fails (or vice versa). Alternatively, or in addition thereto, the computer system 202 may be used as a check on traditional sensing (or vice versa). In yet other applications, the computer system 202 may be used as a sensor for various non-sensible properties of the industrial process 102 to provide improved control.

In the present example, the computer system 202 receives from the image capture device 114 images (still or video) depicting the real-time level (height) of the molten polymer within the extruder vessel 104. The machine learning model stored in the computer system 202 is trained and configured to convert these images and/or video of the polymer level into corresponding numeric values that can be read by the closed-loop controller 110. In some aspects, as described in more detail below, the machine learning model may be programmed and otherwise trained to digitally label each image with the corresponding numeric value, which effectively relates the calculated numeric values to the corresponding image for future reference by the closed-loop controller 110. The closed-loop controller 110 compares the calculated numeric values of each image with a predetermined numeric value for the desired level (height) of the polymer within the extruder vessel 104. If the incoming numeric value does not match the predetermined numeric value or falls outside of a predefined threshold (range) near the predetermined numeric value, the closed-loop controller 110 may be configured to operate the actuator(s) 112 to adjust operation of the industrial process 102 (e.g., the extruder) until the level (height) of the polymer reaches the desired level of the polymer.

The machine learning model stored in the computer system 202 needs to be properly trained before it can be deployed to receive and convert visual data received from the image capture device 114 into numeric data usable by the closed-loop controller 110. Consequently, there is a training phase or supervised learning phase that the machine learning model must first undergo prior to operating in the closed-loop control phase generally described above. As used herein, the terms "image" and "video" are used interchangeably, since video is merely a series of images taken in time. The principles of the present disclosure are equally applicable to dealing with individual, stationary (still) images as well as video.

Figure 3:
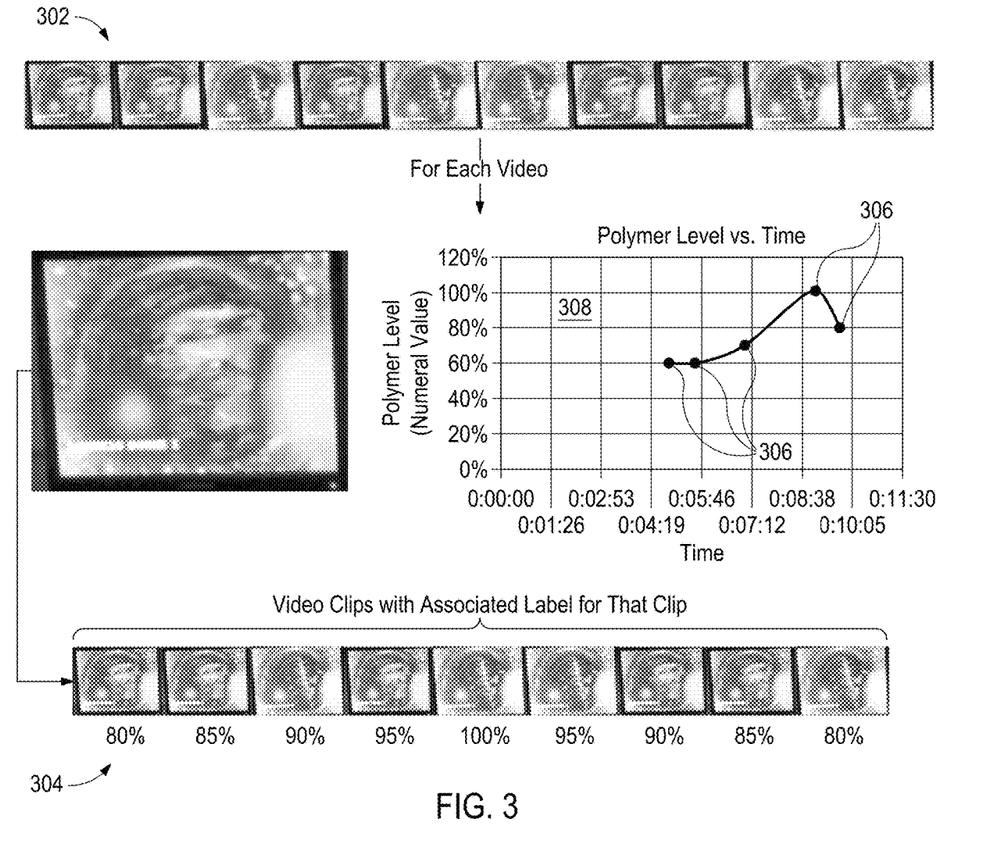
FIG. 3 graphically depicts how the machine learning model can be trained by collecting video data of the non-sensible process to be measured, according to one or more embodiments.

Referring to FIG. 3, the machine learning model can be trained by collecting video data 302 of the non-sensible process to be measured. In the illustrated example the video data 302 comprises a series of still images of the non-sensible process; e.g., an internal view of the extruder vessel 104 (FIGS. 1 and 2). Each image or combination of images of the video data 302 are then manually labeled by trained personnel based on operator experience. As used herein, "labeling" an image (or series of images) refers to trained personnel (e.g., one or more trained operators) providing and otherwise assigning a label 304 to the current image (or series of images) based on the experience of the trained personnel with the non-sensible process and the operating conditions associated the non-sensible process. The assigned label 304 can take any number of forms, depending on the process and the observed properties. The assigned label 304 may be a numeric value (e.g., a percentage, volume, height, product quality grade, viscosity). The assigned label 304 may identify or mark a region or portion of an obtained image or image. The region or portion may identify, for example, the material (e.g., a polymer) within the reactor or vessel as opposed to the entire vessel. The region or portion may identify components located within or portions of the reactor that are not readily visible or sensed by conventional sensing techniques. The assigned label 304 may also assign a classification to a property of a material or component within the non-sensible process that impacts the final product produced (e.g., a polymer property (transparent or opaque) within the vessel, product quality or grade, property type (e.g., differentiate between liquid, gas or different materials or phases). The label 304 is the label or value that the machine learning model will be trained to predict by associating each image (or series of images) with its assigned label or value 304. Thus, the machine learning model will be trained to replicate measurements and assessments that would otherwise be made by trained personnel. The training data is preferably clustered utilizing reduced encodings from an autoencoder to intelligently select the training data.

As an example, each label 304 depicted in FIG. 3 is in the form of a numeric value, specifically a numeric percentage. In the illustrated example, the label 304 may correspond to the real-time level (height) of the polymer within the extruder vessel 104 (FIGS. 1 and 2). More particularly, a label 304 of 75% may refer to the level of the polymer reaching about 75% of the maximum capacity within the extruder vessel 104. As will be appreciated, however, the label 304 can be represented in various other numeric forms as long as the label 304 is able to be recognized and interpreted by the closed-loop controller 110 (FIG. 2) for computer decision-making. Suitable forms of the label 304 include, but are not limited to, percentages, real numbers, real numbers with units of measurement, scaled numbers (e.g., 1-10, 1-100, etc.), classifications (e.g., 1=good, 2=bad, etc.), or any combination thereof. Similarly, if the label 304 represents a relevant portion of an image or a classification, the portion or classification must be presented in such a manner that label 304 is able to be recognized and interpreted by the closed-loop controller for computer decision-making.

In some embodiments, during this process the label 304 may also be associated with a particular time and frame of the captured video data 302. In such embodiments, corresponding data points 306 may be plotted on a numeric value v. time graph 308. Accordingly, the video data 302 may be converted into numeric data based on time, frame, and numeric value 304 (alternately referred to as "label"), as shown in Table 1 below.

TABLE 1

| Time | Frame | Numeric Value |
|---|---|---|
| 0:04:48 | 8640 | 60% |
| 0:05:32 | 9960 | 60% |

TABLE 1-continued

| Time | Frame | Numeric Value |
|---|---|---|
| 0:06:59 | 12570 | 70% |
| 0:08:58 | 16140 | 100% |
| 0:09:42 | 17460 | 80% |

Figure 4:
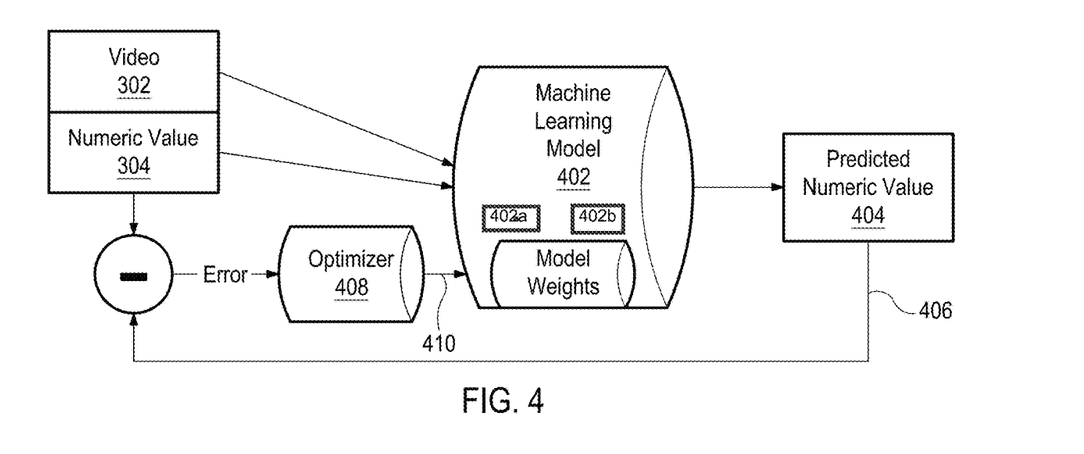
FIG. 4 is a graphic representation of training the machine learning model, according to one or more embodiments

Referring now to FIG. 4, after each image or combination of images of the video data 302 (FIG. 3) are properly labeled by the trained personnel, and corresponding labels 304 are applied, the video data 302 and corresponding labels 304 may be jointly provided to and otherwise input into a machine learning model 402 for training. During the training process, the machine learning model 402 will calculate and output a predicted numeric value, label or classification 404 for the particular image. A feedback loop 406 returns the predicted numeric value or label 404 to be compared with the label 304 assigned by the trained personnel and determine the error of the predicted label 404 in view of the human supplied label 304. This error may then be processed in an optimizer 408 (e.g., a mathematical computer model), which may be configured to minimize the error by incrementally adjusting one or more numerical weights and output improved model weights 410. The improved model weights 410 is then provided to the machine learning model 402 to find a new predicted label 404 based off a new model utilizing the numerical weights. The new predicted label 404 is then compared against the human supplied numeric value 304, the error between the two is again determined, and the new prediction is run through the optimizer 408 again to output a new improved model weights 410. The machine learning model 402 may then adjust the numerical weights for the new improved model weights 410 to output yet another new predicted numeric value 404. This training loop and process continues until the error between the human-supplied label 304 and the predicted numeric value 404 is minimized, such as until the predicted label 404 matches or falls within a predetermined separation threshold with the human supplied label 304.

In some applications, the internals of the machine learning model 402 may use a stochastic (random) process. Consequently, the non-deterministic randomness of the process of training the machine learning model 402 requires multiple passes (epochs) through the same data to converge the machine learning model 402 to a minimum error state for each pair of input video data 302 and corresponding label 304.

The machine learning model 402 may be hosted on a variety of hardware platforms, including conventional Windows or Linux servers, on edge devices, or in the cloud. Once the machine learning model 402 is properly trained using a plurality of pairs of input video data 302 and corresponding label 304, the machine learning model 402 may be deployed in the computer system 202 (FIG. 2). In some embodiments, the machine learning model 402 may be used offline to make measurements on previously captured video data 302. As will be appreciated, making measurements on previously captured video data 302 may serve to validate the accuracy of the machine learning model 402 to ensure that it was trained properly, and also to make measurements on historically captured data. In other embodiments, the machine learning model 402 may be used online with a live image/video feed to generate measurements in real-time. In example online operation, the machine learning model 402 may be capable of receiving new images or videos of the non-sensible process condition as input, and produce accurate numeric values as output. The numeric values may then be provided to the closed-loop controller 110 (FIG. 2) to achieve closed-loop process control and thereby automatically regulate operation of the industrial process 102 and ensure that the non-sensible process remains in proper operating conditions. The real-time generated measurements may also be used off-line as historically captured data, as described above.

In some instances during operation, images or video may be provided to the machine learning model 402 that may be considered "outlier" data. Outlier data includes images or data obtained from the image capture device 114 (FIGS. 1 and 2) that includes fragments, remnants, or other foreign elements that are generally dissimilar to the video data 302 (FIGS. 3 and 4) used to train the machine learning model 402. In some cases, for example, a foreign object may pass in front of the image capture device 114 (FIGS. 1 and 2) during operation and partly or entirely occlude the view of the non-sensible process. Such images and data would be considered abnormal and an outlier since they do not comport with the video data 302 used to train the machine learning model 402. The abnormal and outlier data can be flagged for human review to determine whether or not there is an issue with the image capture device or the process itself. Outlier data can additionally include data that is dissimilar to the training set data. For instance, if the model for a polymer extruder was trained using opaque polymer, but then transparent polymer is introduced to the model, images of the transparent polymer may be considered outlier data. Other cases of outlier data may include, for example, changes in lighting, environmental conditions like rain, snow, or fog; rare or unusual conditions in the non-sensible process, partial or complete image corruption, missing frames in a video, shifts in camera focus, or errors intrinsic to digital image processing like aliasing or resizing interpolation error.

In the polymer extruder example, the machine learning model 402 may be trained based on images and video of the screw gear 106 (FIG. 1) rotatably mounted within the extruder vessel 104 (FIGS. 1 and 2) and polymer in flux and partially filling the extruder vessel 104. If the machine learning model 402 receives images or data including elements that are foreign to extruders and the video data (FIGS. 3 and 4) used to train the machine learning model 402 that may be considered outlier data.

To assist in handling outlier data robustly, in some embodiments, the machine learning model 402 may include a "filtering" auto-encoder module 402a designed to produce an output image reproducing the original image, but showing just the essential features of the image required for accurate labeling (i.e., assigning a numeric value). The filtering auto-encoder module 402a filters out irrelevant information or noise contained in the image (e.g., fog or splattering). The filtering auto-encoder 402a can also adjust for image shifts (e.g., the image capture device 114 is out of position or produced an off centered image). More specifically, the "filtering" auto-encoder module 402a may be configured to dynamically reject and/or filter out visual disturbances that may be present in the original image and provide the machine learning model 402 with a reproduced image without the outlier data. The corrections performed by the filtering auto-encoder reduces the error value associated with the image increasing reliability and the accuracy in monitoring non-sensible process parameters. The filtering auto-encoder pre-processes the images before a predicted label is applied. To demonstrate this method, two machine learning models were built to infer the angle of the pendulum shown in FIGS. 7A, 7B, 8A, 8B, 9A, and 9B. The models were identical except that one model includes a filtering auto-encoder, while the other model does not. Table 2 shows the mean-squared-error that results from each model across a variety of image disturbances. It can be seen that in certain scenarios, the inclusion of a filtering auto-encoder reduces the error by more than a factor of 10.

TABLE 2

Numerical Results for Filtering Auto-Encoder

| Prediction MSE | Clean Images [FIG. 7] | Blocked [FIG. 9] | Noise | Splatter [FIG. 8] | Fog | Blur | Shifted |
|---|---|---|---|---|---|---|---|
| Without Filtering Autoencoder | 0.024 | 1.092 | 0.598 | 0.890 | 1.141 | 0.165 | 0.750 |
| With Filtering Autoencoder | 0.023 | 0.699 | 0.057 | 0.537 | 0.991 | 0.031 | 0.526 |

Figure 7A:
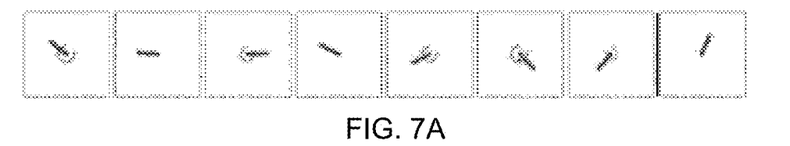
FIGS. 7A, 7B, 8A, 8B, 9A, and 9B are graphic illustrations of the removal of outlier data utilizing a process control system having a filtering auto-encoder according to one or more embodiments.
Figure 7B:
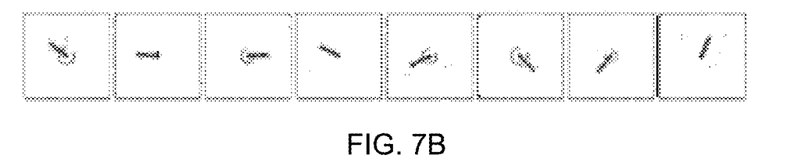
Figure 8A:
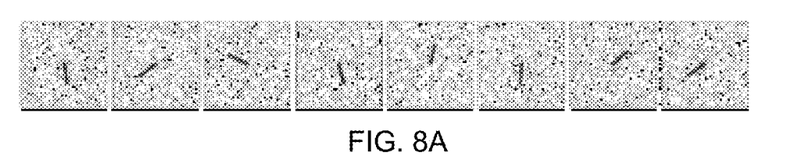
Figure 8B:
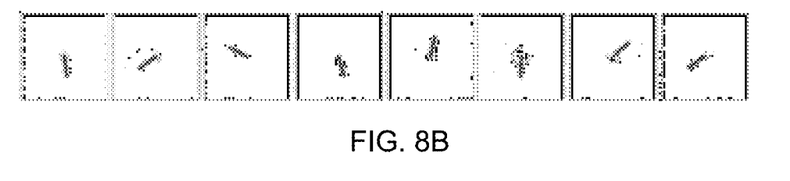
Figure 9A:
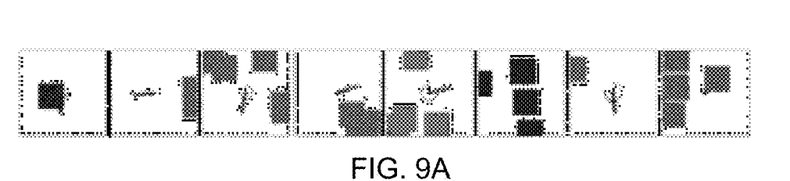
Figure 9B:
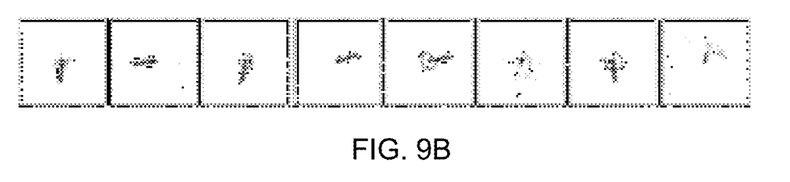

FIGS. 7A, 7B, 8A, 8B, 9A, and 9B illustrate examples of potential corrections performed by the filtering auto-encoder 402a. FIG. 7A illustrates a clean image. The filtering auto-encoder 402a detects no abnormalities or outliers in the image, so that no revisions or adjustments are made to the output image, as shown in FIG. 7B. FIG. 8A illustrates an image containing splattering. The filtering auto-encoder 402a detects the splattering and adjusts the image to remove the splattering to produce an updated output image, as shown in FIG. 8B. FIG. 9A illustrates an image containing blocked portions. The filtering auto-encoder 402a detects the blocked portions and corrects the same to produce an updated output image, as shown in FIG. 9B. The auto-encoder module 402a may thus be configured to sense when the input data is foreign, abnormal, or an outlier, and may filter out the outlier features upon detection. The outlier data may also be utilized to further utilized to train the machine learning module 402 to recognize various disturbances (e.g., blur, noise, blockage, splatter, shifting and fog).

To assist in detecting outlier data, in some embodiments, a "reconstruction" auto-encoder module 402b may also be configured to produce a "confidence" metric representative of whether the incoming video data can be relied upon for accurate measurement. In some implementations, this confidence metric may be produced by leveraging the property that auto-encoder modules only are only effective at "reconstructing" images similar to their training data. The reconstruction auto-encoder 402b is trained to effectively reproduce the training set of the machine learning model 402. The reconstruction auto-encoder 402b attempts to reconstruct an image based upon data that it has already seen before (i.e., the training set of data) and identifies how similar the image captured by the image capture device 114 is to the training set. The reconstruction encoder 402b and their reconstructed images are utilized to determine whether or not an anomaly is present. The anomalies may represent differences (e.g., cloudy sky v. sunny sky in training image), which may be utilized to further train the machine learning module 402. The anomalies may also represent more significant differences including potential issues with the image capture device 114 or the underlying process, which may trigger an alarm for further review and analysis by the operator. When presented with a new image not part of the training set, the error between the reproduction and the original image may be used to produce the confidence metric. The confidence metric may be utilized to assess the degree or severity of the anomaly and whether additional action is needed by the operator.

In some other implementations, this confidence metric may be produced by utilizing the reconstruction auto-encoder's 402b ability to generate a low-dimensional set of numbers from a high-dimensional input image. In this case, the auto-encoder 402b is trained with the training set of the machine learning model 402, then used to produce encodings for all the images or videos in that training set. When presented with a new image not part of the training set, the encoding for the new image is compared to the training set's encodings, and the degree of similarity between the new encoding and the training set's encodings is used to generate the confidence metric. In this manner it is possible to dynamically assess the prediction confidence of the data from the image capture device. For example, the comparison may be performed using a distance metric such as Euclidean distance or cosine similarity, or it may be performed using other novelty detection algorithms. In some embodiments, the "reconstruction" auto-encoder 402b may be configured to be the same module as the "filtering" auto-encoder 402a, while in other embodiments, the two may constitute distinct and separate modules.

In some other embodiments, this confidence metric may be produced by extracting the machine learning model's internal numerical intermediate outputs, or "features" in a process we call "feature extraction". These "features" have the property that they are large in value when the model encounters image or video input containing objects or patterns that are relevant to the label it is trying to predict, and they are small in value when the model encounters visual patterns that are irrelevant to the label. In this way, the set of features for a particular image, taken as a whole, form a fingerprint for that image. A confidence metric can then be created by first building a "fingerprint database" out of all the images in the training set, which are known to be valid and useful images. Then for any particular input, its "fingerprint" is captured and compared to the "fingerprint database". The degree of similarity between the new fingerprint and those in the database is used to generate the confidence metric. In some embodiments, for example, this comparison may be performed using a distance metric such as average Euclidean distance or cosine similarity, or it may be performed using novelty detection algorithms such as a one-class support vector machine.

Figure 10:
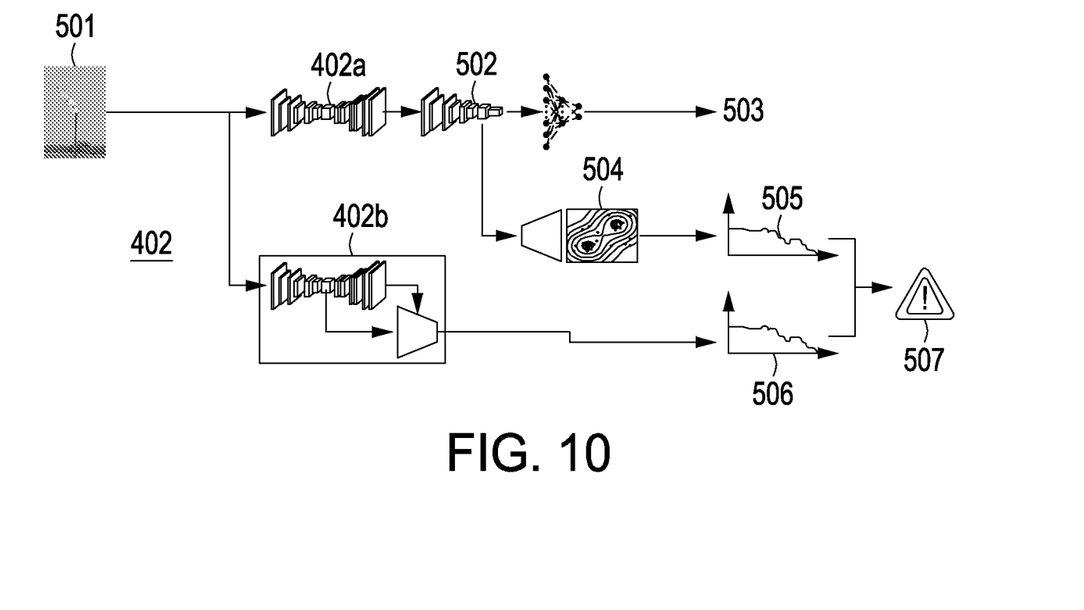
FIG. 10 is a schematic diagram illustrating a particular embodiment of a machine learning model in accordance with the principles of the present disclosure.

FIG. 10 is a schematic diagram illustrating a particular embodiment of the machine learning model 402, in which various constituent components are assembled together as a system. The model accepts some image or video stream, represented by 501, as an input from the image capture device 114. The input is first cleaned of disturbances by the filtering autoencoder, 402a, then fed into a predictor 502 to generate an output label 503. The intermediate outputs of the predictor, 502, are fed into a feature-extraction based anomaly detector 504 to generate its confidence metric 505.

In parallel, the input 501 of the image is fed into the reconstruction autoencoder system, 402b, which generates a separate confidence metric 506. Together, the two confidence metrics 505 and 506 can be used to trigger a performance alarm 507, which alerts plant operators and engineers to a problem with the model and a potential anomaly that needs to be addressed by the operators.

In some embodiments, for example, the confidence metric may comprise a percentage, and a confidence metric of 75% may mean that the video data used to calculate the numeric value is 75% accurate. In some embodiments, the confidence metric may be provided to the closed-loop controller 110, and if the confidence metric falls below a predetermined confidence threshold or value, the closed-loop controller 110 may be configured to disregard the corresponding numeric value. As will be appreciated, this may prove advantageous in avoiding drastic operational changes to the non-sensible process based on faulty (erroneous) data. Moreover, calculating the confidence metric may also serve as a type of alarm that might result in remedial action being undertaken to remove the foreign object causing visual disturbances and outlier data. In such cases, if the confidence metric falls below the predetermined confidence, an alert may be provided to an operator, who may assess the situation and determine if any action needs to be taken to mitigate or correct the issue causing the outlier data.

One action that the operator may take to mitigate outlier data is to train the model with example outlier data. In doing this, the model accuracy can be improved when it next encounters a similar type of outlier data. For example, if outlier data consists of transparent polymer images, when the model was trained with opaque polymer images, the low confidence metric would alert operators to the fact that the model is currently insufficient for transparent polymer images. The operator could then initiate a work process for the model to be retrained to incorporate the transparent polymer images.

One challenge that arises in capturing outlier data is that such outliers may be rare and difficult or impossible to capture in sufficient quantities to train the machine learning model. Identification of such outliers is achieved by either observing a particularly rare outlier scenario in the data, or by prior knowledge and experience that such an outlier has the potential to occur in this dataset. To address this challenge, in some implementations, the dataset can be manipulated to incorporate such outlier data. In the case of outlier data that constitutes disturbances, such disturbances may, for example, be overlaid onto the image. For example, FIG. 7A and FIG. 8A, are images of a pendulum in which synthesized splattering and blockages have been overlaid onto the image. In the case of outlier data that constitutes unusual scenarios, images of such scenarios can be synthesized and incorporated into the dataset. For example, in the case of polymer production, if it is known that one unusual scenario is the occurrence translucent polymer in a production line designed to produce opaque polymer, images of the opaque polymer can be synthetically manipulated to instead show translucent polymer, and subsequently imported into the training set.

Figure 11:
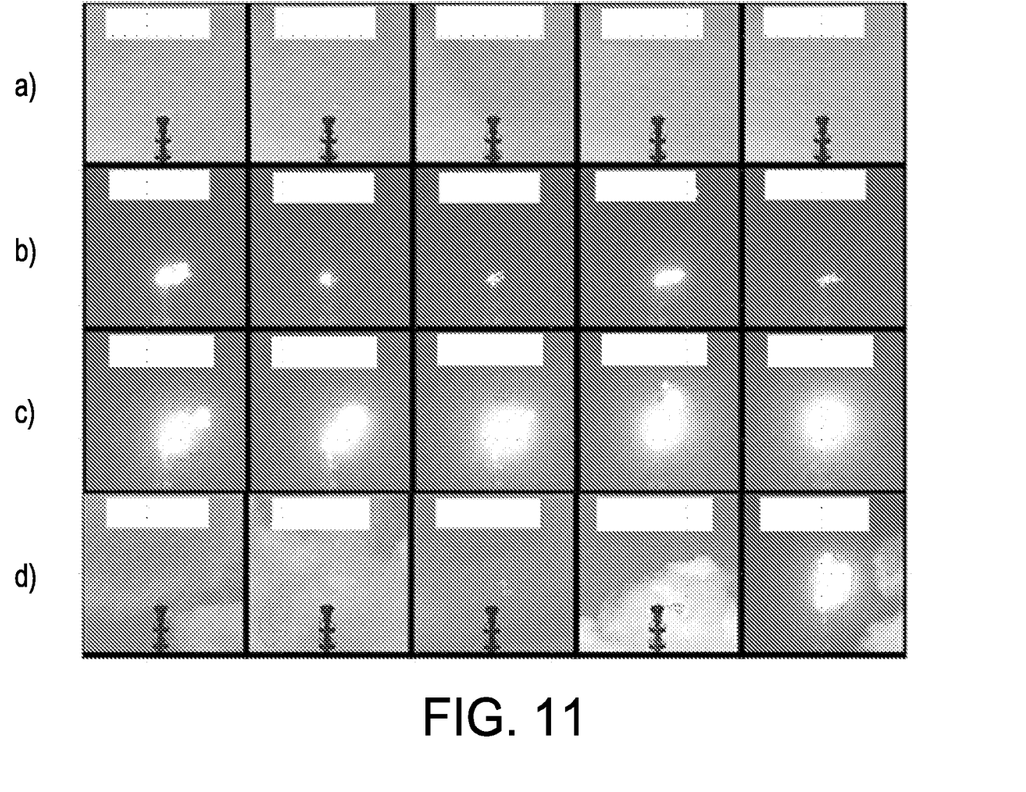
FIG. 11 is a graphic illustrations of the results of the clustering analysis performed in accordance with the principles of the present disclosure.

Another challenges that arises in capturing and training with outlier data is determining which images are, in fact, outliers when typical training set sizes may range from thousands of images to more than millions of images. To address this challenge, in some implementations, the detection of both groups of similar data, as well as dissimilar outlier data, in the training set may be performed by running an unsupervised clustering algorithm, such as K-means or DBSCAN, over the training set's encoding outputs (generated from the reconstruction autoencoder). This process results in images being automatically sorted into groups of similar appearances, as shown for example in FIG. 10. For example, such a grouping could sort all images of transparent polymers into one group, all images of opaque polymers into another group, and identify which outlier images belong in neither group. The quantity of each grouping of images may then be assessed to determine whether images of that group exist in sufficient quantities to train the model. For example, after a period of training data capture, a cluster analysis on the training data may find that there are thousands of opaque polymer images, only hundreds of transparent polymer images, and hundreds other assorted outliers. FIG. 11 illustrates the results of such a clustering analysis performed upon a set of ten thousand flare images. Each row of images constitutes a unique cluster that the analysis has found, with the exception of the last row, which is formed by outlier images that did not fit into any cluster. The first cluster (row a) constitutes images where no flame is visible in the flare, and the environment is daytime. The second cluster (row b) constitutes images in which a small flame is visible, and the environment is nighttime. The third cluster (row c) constitutes images in which a large flame is visible, and the environment is nighttime. The outlier images (row d) are distinguished by the appearance of assorted cloud patterns in various lighting conditions. After such a clustering analysis is performed, the assignment of labels to the images is made significantly easier by the fact that images of similar appearance are already grouped. For example, rather than having to individually label thousands of images of flares for flame size, an operator or engineer can identify that a certain cluster of images, as found by the automatic unsupervised clustering algorithm, is constituted completely by flares with small flames and assign a label to that effect.

Figure 5:
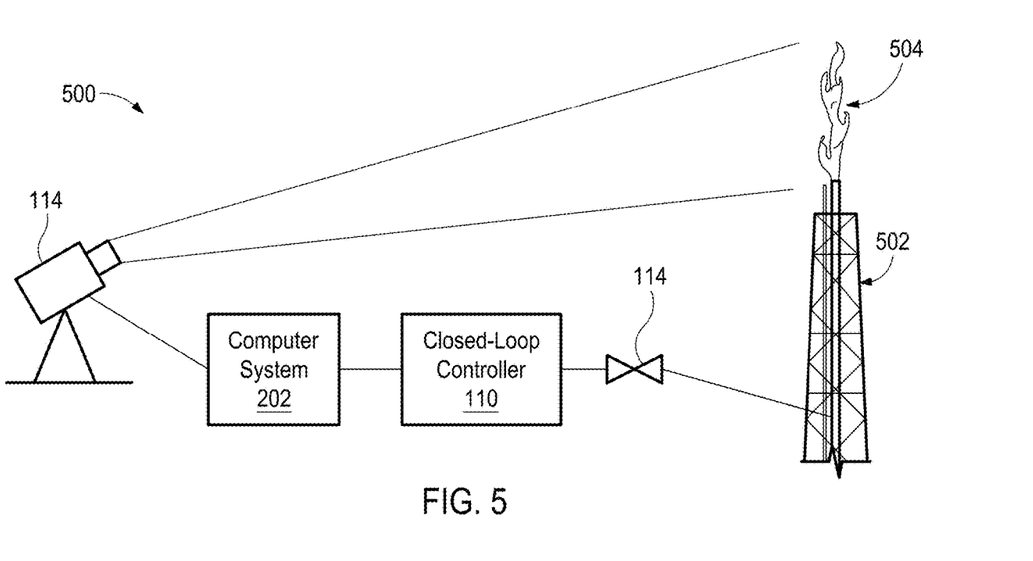
FIG. 5 is a schematic diagram of another example process control system in accordance with the principles of the present disclosure.

FIG. 5 is a schematic diagram of another example process control system 500 in accordance with the principles of the present disclosure. The process control system 500, alternately referred to as the process control "scheme," may be similar in some respects to the process control system 200 of FIG. 2, and therefore may be best understood with reference thereto, where like numerals will represent like components not described again in detail. Similar to the process control system 200, the process control system 500 is designed to monitor and control operation of an industrial process 502 and, more particularly, a non-sensible process condition of the industrial process 502. Moreover, similar to the process control system 200, the process control system 500 includes the image capture device 114, the computer system 202, and the closed-loop controller 110. In some embodiments, as illustrated, the closed-loop controller 110 may be separate from the process control system 200, but may alternatively form an integral part of the computer system 202, without departing from the scope of the disclosure.

In the illustrated example, the industrial process 502 comprises a flare 504 of a flare stack, and the non-sensible process condition may be the real-time condition of the flare 504 during operation. Example conditions of the flare 504 that may be measured using the process control system 500 include, but are not limited to, the quantity of the smoke (e.g., the ratio of smoke to flare 504), the color of the smoke, the color of the flare 504, the size of the flare 504, time intervals between smoking and flaring, the fuel-air combustion ratio or any combination thereof.

Imagery of the flare 504 can be highly variable depending on the day/night cycles, variable weather, and other inconsistent conditions, and may thus be difficult to access with conventional computer vision methods. The color of the flare 504, for example, may indicate what type of chemicals are being emitted into the environment, and there are government regulations on the type and quantity of certain chemicals that can be emitted into the air via flares. If the smoke emitted by the flare 504 is excessively dark or if there is a high volume of smoke, that may be an indication that the fuel-air combustion ratio of the feed to the flare 504 is excessively rich (too little air for complete combustion of the fuel). If such a condition is sensed, a control action may be taken to increase the amount of air being fed to the flare 504, such as injecting steam into the flare feed line, which provides turbulence at the flare outlet to promote mixture of fuel and air. If the smoke is too light or there is a general lack of smoke, that may be an indication that the mixture might be too lean, in which case there would be room to reduce the level of steam injection and thus improve the efficiency of the flare 504.

In the present example, the computer system 202 receives from the image capture device 114 images (still or video) depicting the real-time state or condition of the flare 504. The machine learning model stored in the computer system 202 may be configured to convert the captured images and/or video of the flare 504 into corresponding numeric values that can be read by the closed-loop controller 110. The closed-loop controller 110 may compare the calculated numeric values of each image with a predetermined numeric value for the state or condition of the flare 504. If the incoming numeric value does not match the predetermined numeric value or otherwise falls outside of a defined threshold (range) near the predetermined numeric value, the closed-loop controller 110 may be configured to operate the actuator(s) 112 to adjust operation of the industrial process 502 until the state or condition of the flare 504 reaches the desired state or condition. In some applications, adjusting the actuator(s) 112 may cause more or less steam to be provided to the flare 504, which can adjust various operational parameters of the flare 504 and what it emits into the surrounding environment.

While not shown, in some embodiments, the thermodynamic sensor(s) 108 (FIG. 1) may also be included in the process control system 500 and in communication with the closed-loop controller 110, as generally described above. In such embodiments, the thermodynamic sensor(s) 108 and the computer system 202 may operate jointly to provide adequate measurement and control over all operating states of the industrial process 502. In some applications, for instance, the computer system 202 may be used to control operation of the industrial process 502 when traditional sensing using the thermodynamic sensor(s) 108 fails (or vice versa). Alternatively, or in addition thereto, the computer system 202 may be used as a check on traditional sensing (or vice versa). In yet other applications, the computer system 202 may be used as a sensor for various non-sensible properties of the industrial process 502 to provide improved control.

Alternatively, the process control system 500 may be designed to monitor and control operation of a different industrial process, such as a furnace or boiler that uses flames for heating and other purposes. In such embodiments, the non-sensible process of the furnace or boiler may be the flame generated, and the process condition to be measured can include, but is not limited to, flame stability, shape of the flame, size of the flame, frequency of flicker of the flame, fuel-air combustion ratio, or any combination thereof. None of the foregoing process conditions are thermodynamic variables that can be accurately or reliably measured using conventional thermodynamic instrumentation. The process control system 500, however, may be employed to monitor the real-time condition of the flame and regulate operation of the furnace or boiler to help maintain operation of the flame within predetermined (safe) limits.

The presently disclosed deep machine learning computer vision application has several advantages over conventional measurement and computer vision applications. Conventional measurement and computer vision applications commonly include conventional thermodynamic measurement devices and instrumentation. Conventional instrumentation, however, is limited to the measurement of thermodynamic variables such as pressure, temperature, mass, volume, density, flow, etc. At least one advantage of the embodiments described herein is the ability to obtain numeric measurement in applications where conventional instrumentation cannot be used, such as in the measurement of non-thermodynamic quantities or where process constraints make usage of conventional instrumentation unreliable or infeasible.

Conventional measurement and computer vision applications also include conventional computer vision algorithms, which differ from the presently disclosed approach in that the conventional video processing algorithms are manually designed by trained personnel (e.g., one or more trained engineers), rather than trained via machine learning. In the most general sense, conventional processing algorithms consist of comparing pixel colors to some reference value. For example, conventional computer vision algorithms can be used for the automated rejection of green-colored tomatoes in favor of red tomatoes, or for the detection of liquid level in industrial storage tanks by comparing the region of pixels where the liquid surface is nearby the tank wall to detect the location of the liquid surface and translate that to a level measurement. Moreover, the cameras used in conventional measurement and computer vision applications constitute direct geometric measurement devices that require controlled conditions and limited variability in each data set.

The advantage of the present embodiments is that the machine learning model can be used for applications where conventional computer vision is unsuitable. The present disclosure improves upon conventional computer vision applications in that the presently described machine learning model can be trained to emulate a human's understanding of the image.

Another advantage is that the presently-disclosed machine learning model can be used to replicate measurements that conventionally must be made offline with high-precision instrumentation. For instance, measurement of polymer viscosity is often made offline by periodically extracting a sample of the polymer from the process equipment and performing the measurement in the lab. By training the presently-disclosed machine learning model with laboratory measurements of the viscosity as the label, the model can be trained to associate images of the polymer with high-precision viscosity measurements and thereby reproduce those high-precision viscosity measurements using images as input. More specifically, in such embodiments, video data and laboratory measurements of the non-sensible process may be obtained. The video data and the laboratory measurements may be inputted into the machine learning model, and a predicted numeric value may be calculated with the machine learning model based on the video data. The predicted numeric value may then be compared with the laboratory measurements, and the predicted numeric value may subsequently be optimized in view of the laboratory measurements until error between the predicted numeric value and the laboratory measurements is minimized.

Moreover, prior deep-learning based computer vision has been used commercially for "classification" tasks, which involve identifying or categorizing features in images. Existing examples include optical character recognition (OCR), face identification, object recognition, automated part inspection via pass/fail categorization, and medical image categorization. One distinction between the presently-disclosed machine learning model and the widely used commercial application of deep learning is that in the currently described approach, the machine learning model may be used to regress real-numbered values from images, whereas the commercial applications usually just produce a classificational label from an image.

Moreover, the machine learning model can be used for the measurement of industrial processes with real-time continuous video input. The real-time video feed is used for automatic process control, and automatic control minimizes operator intervention. Accordingly, the presently-disclosed deep learning model can be used to produce real numbers from videos in real time, and this can be used to make measurements on non-sensible properties of a process, which helps control operation of an industrial process including a non-sensible process condition. As will be appreciated, the principles described herein have the potential for adoption in many applications that include or operate a non-sensible process condition.

Figure 6:
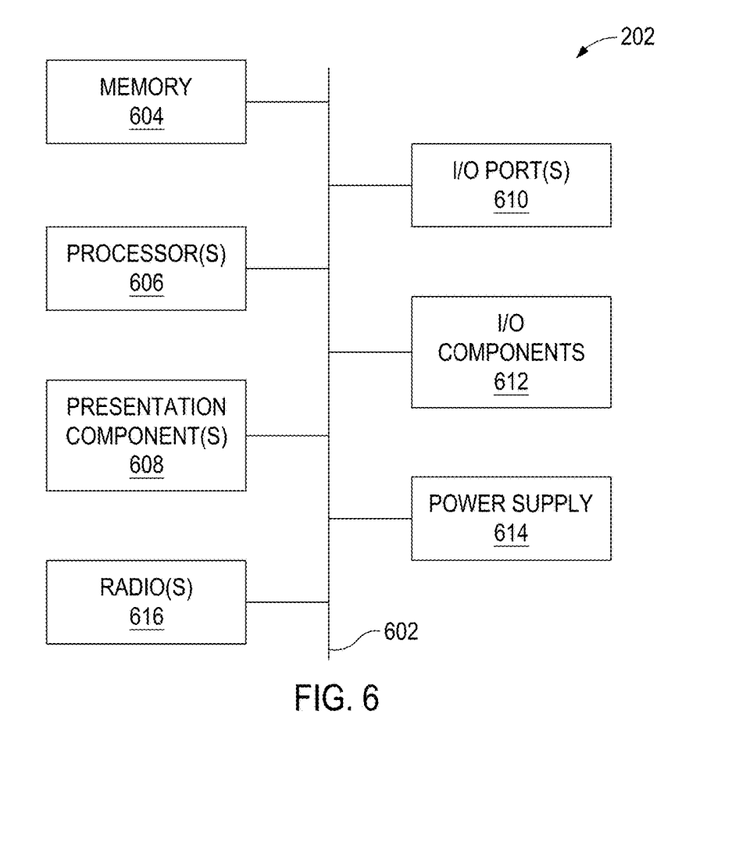
FIG. 6 is a schematic diagram of the computer system of FIGS. 2 and 6, according to one or more embodiments.

FIG. 6 is a schematic diagram of the computer system 202 of FIGS. 2 and 6, according to one or more embodiments. The computer system 202 is but one example of a suitable computing environment and is not intended to suggest any limitation as to the scope of use of the technology described herein. Neither should the computer system 202 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

As illustrated, the computer system 202 includes a bus 602 that directly or indirectly couples the following devices: a memory 604, one or more processors 606, one or more presentation components 608, input/output (I/O) ports 610, I/O components 612, a power supply 614, and a radio 616. The bus 602 represents what may be one or more busses (such as an address bus, data bus, or a combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. In addition, processors have memory. The inventors hereof recognize that such is the nature of the art and reiterate that the diagram of FIG. 6 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 6 and refer to "computer," "computing device," or "computer system."

The computer system 202 typically includes a variety of computer-readable media. Computer-readable media can be any available media that can be accessed by the computer system 202 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

The memory 604 includes computer storage media in the form of volatile and/or nonvolatile memory. The memory 604 may be removable, non-removable, or a combination thereof. Exemplary memory includes solid-state memory, hard drives, optical-disc drives, etc.

The processors 606 may be configured to read data from various entities such as the bus 602, the memory 604, or the I/O components 612. The presentation component(s) 608 present data indications to a user or other device. Exemplary presentation components 608 include a display device, speaker, printing component, vibrating component, etc. The I/O ports 610 allow the computer system 202 to be logically coupled to other devices, including the I/O components 612, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In some aspects, a pen digitizer (not shown) and accompanying input instrument (also not shown but which may include, by way of example only, a pen or a stylus) are provided in order to digitally capture freehand user input. The connection between the pen digitizer and the processor(s) 606 may be direct or via a coupling utilizing a serial port, parallel port, and/or other interface and/or system bus known in the art. Furthermore, the digitizer input component may be a component separated from an output component such as a display device, or in some aspects, the useable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computer system 202. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computer system 202. The radio 616 transmits and receives radio communications.

The computing device may be a wireless terminal adapted to receive communications and media over various wireless networks. The computer system 202 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Embodiments Listing

The present disclosure provides, among others, the following examples, each of which may be considered as optionally including any alternate example.

Clause 1. A method of monitoring and controlling an industrial process includes capturing images of a non-sensible process condition of the industrial process with an image capture device, receiving the images of the non-sensible process condition with a computer system, converting each image into a corresponding numeric value with a machine learning model stored in and operable by the computer system, receiving and comparing the corresponding numeric value to a predetermined numeric value for the non-sensible process condition with a closed-loop controller, and causing an actuator to operate with the closed-loop controller and thereby adjusting operation of the industrial process when the corresponding numeric value fails to match the predetermined numeric value or is outside of a defined threshold near the predetermined numeric value.

Clause 2. The method of Clause 1, further comprising training the machine learning model by collecting video data of the non-sensible process, manually labelling each image of the video data with a human-supplied numeric value, inputting the video data and the human-supplied numeric value into the machine learning model, calculating a predicted numeric value with the machine learning model based on the video data, comparing the predicted numeric value with the human-supplied numeric value, and optimizing the predicted numeric value in view of the human-supplied numeric value until error between the predicted numeric value and the human-supplied numeric value is minimized.

Clause 3. The method of Clause 2, wherein manually labelling each image of the video data comprises labelling each image with a trained operator based on the operator experience with the nonsensible process condition.

Clause 4. The method of Clause 2, wherein manually labelling each image of the video data further comprises associating the human-supplied numeric value with a time and a frame of the video data.

Clause 5. The method of any of Clauses 2 through 4, wherein optimizing the predicted numeric value includes a) incrementally adjusting one or more numerical weights within the machine learning model, b) outputting a new predicted numeric value based off a new model utilizing the one or more numerical weights, and c) repeating steps a) and b) until the one or more numerical weights are such that the error in the predicted numerical value is minimized.

Clause 6. The method of any of the preceding Clauses, further including generating a machine learning model dataset from the machine learning model based on the video data, wherein generating a reduced dimension encoding for each image of the machine learning model dataset, wherein generating a reduced dimension encoding utilizes an auto-encoder, generating groupings of similar images and a group of outlier images utilizing a set of the reduced dimension encodings, utilizing the groupings to facilitate labeling of the dataset, and utilizing the group of outlier images to identify outlier data.

Clause 6. The method of any of the preceding Clauses, further comprising training the machine learning model by collecting video data of the non-sensible process, collecting laboratory measurements of the non-sensible process, inputting the video data and the laboratory measurements into the machine learning model, calculating a predicted numeric value with the machine learning model based on the video data, comparing the predicted numeric value with the laboratory measurements, and optimizing the predicted numeric value in view of the laboratory measurements until error between the predicted numeric value and the laboratory measurements is minimized.

Clause 7. The method of any of the preceding Clauses, wherein the corresponding numeric value comprises a numeric form recognizable by the closed-loop controller and selected from the group consisting of a percentage, a real number, a scaled number, a classifier, a class, and any combination thereof.

Clause 8. The method of any of the preceding Clauses, wherein converting each image into the corresponding numeric value with the machine learning model is preceded by receiving each image with an auto-encoder module, removing outlier data from each image with the auto-encoder module, generating a reproduced image without the outlier data for each image, and providing the reproduced image to the machine learning model for calculating the numeric value.

Clause 9. The method of Clause 8, further comprising calculating an error between the reproduced image and an original image for each image, and generating a confidence metric based on the error.

Clause 10. The method of Clause 9, further comprising disregarding the corresponding numeric value when the confidence metric falls below a predetermined confidence threshold.

Clause 11. A process control system includes an image capture device positionable to capture images of a non-sensible process condition of an industrial process, a computer system that receives the images of the non-sensible process condition, a machine learning model stored in and operable by the computer system to convert each image into a corresponding numeric value, a closed-loop controller that receives and compares the corresponding numeric value to a predetermined numeric value for the non-sensible process condition, and an actuator operable to regulate operation of the industrial process, wherein, when the corresponding numeric value fails to match the predetermined numeric value or is outside of a defined threshold near the predetermined numeric value, the closed-loop controller causes the actuator to operate and adjust operation of the industrial process.

Clause 12. The process control system of Clause 11, wherein the image capture device is selected from the group consisting of a two-dimensional camera, a three-dimensional camera, a high-definition camera, an infrared camera, a laser scanner, a thermal camera, and any combination thereof.

Clause 13. The process control system of Clause 11 or Clause 12, wherein the machine learning model is trained by collecting video data of the non-sensible process, manually labelling each image of the video data with a human-supplied numeric value, inputting the video data and the human-supplied numeric value into the machine learning model, calculating a predicted numeric value with the machine learning model based on the video data, comparing the predicted numeric value with the human-supplied numeric value, and optimizing the predicted numeric value in view of the human-supplied numeric value until error between the predicted numeric value and the human-supplied numeric value is minimized.

Clause 14. The process control system of Clause 13, wherein each image of the video data is manually labelled by a trained operator based on the operator experience with the nonsensible process condition.

Clause 15. The process control system of Clause 13, wherein each image of the video data is labelled with a time and a frame of the video data.

Clause 16. The process control system of any of Clauses 11 through 15, wherein the corresponding numeric value comprises a numeric form recognizable by the closed-loop controller and selected from the group consisting of a percentage, a real number, a scaled number, a classifier, a class, and any combination thereof.

Clause 17. The process control system of any of Clauses 11 through 16, further comprising an auto-encoder operable to receive each image and remove outlier data from each image to provide a reproduced image without the outlier data to the machine learning model for calculating the numeric value.

Clause 18. The process control system of Clause 17, wherein the auto-encoder is further operable to calculate an error between the reproduced image and an original image for each image, and generate a confidence metric based on the error.

Clause 19. The process control system of any of Clauses 11 through 18, wherein the industrial process comprises a polymer extruder having an extruder vessel, and the non-sensible process condition is a level of molten polymer within the extruder vessel.

Clause 20. The process control system of any of Clauses 11 through 18, wherein the industrial process comprises a flare stack that emits a flare, and the non-sensible process condition is selected from the group consisting of a quantity of smoke in the flare, a color of the smoke, a color of the flare, a size of the flare, a time interval between smoking and flaring, a fuel-air combustion ratio, and any combination thereof.

Clause 21. The process control system of any of Clauses 11 through 18, wherein the industrial process comprises a flare stack or a furnace that emits a flame, and the non-sensible process condition is selected from the group consisting of flame stability, shape of the flame, size of the flame, frequency of flicker of the flame, a fuel-air combustion ratio and any combination thereof.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method of monitoring and controlling an industrial process, comprising:
    capturing images of a non-sensible process condition of the industrial process with an image capture device;
    receiving the images of the non-sensible process condition with a computer system;
    converting each image into a corresponding numeric value with a machine learning model stored in and operable by the computer system;
    receiving and comparing the corresponding numeric value to a predetermined numeric value for the non-sensible process condition with a closed-loop controller; and
    causing an actuator to operate with the closed-loop controller and thereby adjusting operation of the industrial process when the corresponding numeric value fails to match the predetermined numeric value or is outside of a defined threshold near the predetermined numeric value.

2. The method of claim 1, further comprising training the machine learning model by:
    collecting video data of the non-sensible process;
    manually labelling each image of the video data with a human-supplied label;
    inputting the video data and the human-supplied label into the machine learning model;
    calculating a predicted numeric value with the machine learning model based on the video data;
    comparing the predicted numeric value with the human-supplied label; and
    optimizing the predicted numeric value in view of the human-supplied label until error between the predicted numeric value and the human-supplied label is minimized.

3. The method of claim 2, wherein manually labelling each image of the video data comprises at least one of labelling each image with a trained operator based on the operator experience with the nonsensible process condition, and associating the human-supplied numeric value with a time and a frame of the video data.

4. The method of claim 2, wherein optimizing the predicted numeric value includes:
    a) incrementally adjusting one or more numerical weights within the machine learning model;
    b) outputting a new predicted numeric value based off a new model utilizing the one or more numerical weights; and c) repeating steps a) and b) until the one or more numerical weights are such that the error in the predicted numerical value is minimized.

5. The method of claim 2, further comprising:
generating a machine learning model dataset from the machine learning model based on the video data;
generating a reduced dimension encoding for each image of the machine learning model dataset;
generating groupings of similar images and a group of outlier images utilizing a set of the reduced dimension encodings;
utilizing the groupings to facilitate labeling of the dataset; and
utilizing the group of outlier images to identify outlier data.

6. The method of claim 1, further comprising training the machine learning model by:
collecting video data of the non-sensible process;
collecting laboratory measurements of the non-sensible process;
inputting the video data and the laboratory measurements into the machine learning model;
calculating a predicted numeric value with the machine learning model based on the video data;
comparing the predicted numeric value with the laboratory measurements; and
optimizing the predicted numeric value in view of the laboratory measurements until error between the predicted numeric value and the laboratory measurements is minimized.

7. The method of claim 1, further comprising training the machine learning model using generated synthetic data.

8. The method of claim 1, wherein the corresponding numeric value comprises a numeric form recognizable by the closed-loop controller and selected from the group consisting of a percentage, a real number, a scaled number, a classifier, a class, and any combination thereof.

9. The method of claim 1, wherein converting each image into the corresponding numeric value with the machine learning model is preceded by:
receiving each image with an auto-encoder module;
removing outlier data from each image with the auto-encoder module;
generating a reproduced image without the outlier data for each image; and
providing the reproduced image to the machine learning model for calculating the numeric value.

10. The method of claim 9, further comprising:
calculating an error between the reproduced image and an original image for each image; and
generating a confidence metric based on the error.

11. The method of claim 10, wherein generating the confidence metric includes utilizing the auto-encoder.

12. The method of claim 10, further comprising disregarding the corresponding numeric value when the confidence metric falls below a predetermined confidence threshold.

13. The method of claim 1, further comprising: generating a confidence metric from an extracted intermediate output of the machine learning model, comprising:
generating a fingerprint for each image from the extracted intermediate output;
generating a fingerprint database for fingerprints of the images;
comparing each new fingerprint generated with the fingerprints in the fingerprint database; and
generating a confidence metric based upon the degree of similarity between the new fingerprint and the fingerprints in the fingerprint database.

14. A process control system, comprising:
an image capture device positionable to capture images of a non-sensible process condition of an industrial process;
a computer system that receives the images of the non-sensible process condition;
a machine learning model stored in and operable by the computer system to convert each image into a corresponding numeric value;
a closed-loop controller that receives and compares the corresponding numeric value to a predetermined numeric value for the non-sensible process condition; and
an actuator operable to regulate operation of the industrial process, wherein, when the corresponding numeric value fails to match the predetermined numeric value or is outside of a defined threshold near the predetermined numeric value, the closed-loop controller causes the actuator to operate and adjust operation of the industrial process.

15. The process control system of claim 14, wherein the image capture device is selected from the group consisting of a two-dimensional camera, a three-dimensional camera, a high-definition camera, an infrared camera, a laser scanner, a line scan camera, a thermal camera, and any combination thereof.

16. The process control system of claim 14, wherein the machine learning model is trained by:
collecting video data of the non-sensible process;
manually labelling each image of the video data with a human-supplied label;
inputting the video data and the human-supplied label into the machine learning model;
calculating a predicted numeric value with the machine learning model based on the video data;
comparing the predicted numeric value with the human-supplied label; and
optimizing the predicted numeric value in view of the human-supplied label until error between the predicted numeric value and the human-supplied label is minimized.

17. The process control system of claim 16, wherein each image of the video data is at least one of manually labelled by a trained operator based on the operator experience with the nonsensible process condition, and labelled with a time and a frame of the video data.

18. The process control system of claim 14, wherein the corresponding numeric value comprises a numeric form recognizable by the closed-loop controller and selected from the group consisting of a percentage, a real number, a scaled number, a classifier, a class, and any combination thereof.

19. The process control system of claim 14, further comprising an auto-encoder operable to receive each image and remove outlier data from each image to provide a reproduced image without the outlier data to the machine learning model for calculating the numeric value.

20. The process control system of claim 19, wherein the auto-encoder is further operable to calculate an error between the reproduced image and an original image for each image, and generate a confidence metric based on the error.

21. The process control system of claim 14, wherein the industrial process comprises a polymer extruder having an extruder vessel, and the non-sensible process condition is a level of molten polymer within the extruder vessel.

22. The process control system of claim 14, wherein the industrial process comprises a flare stack that emits a flare, and the non-sensible process condition is selected from the group consisting of a quantity of smoke in the flare, a color of the smoke, a color of the flame, a size of the flame, a time interval between smoking and flaring, a fuel-air combustion ratio, and any combination thereof.

23. The process control system of claim 14, wherein the industrial process comprises a flare stack or a furnace that emits a flame, and the non-sensible process condition is selected from the group consisting of flame stability, shape of the flame, size of the flame, frequency of flicker of the flame, a fuel-air combustion ratio and any combination thereof.

\* \* \* \* \*